(12) United States Patent
Webel

(10) Patent No.: US 9,920,509 B2
(45) Date of Patent: Mar. 20, 2018

(54) FLEXIBLE CONDUIT ELEMENT

(71) Applicant: SJM Co. Ltd., Ansan (KR)

(72) Inventor: Uwe Webel, Offenbach (DE)

(73) Assignee: SJM CO. LTD. (KR)

( * ) Notice: Subject to any disclaimer, the term of this patent is extended or adjusted under 35 U.S.C. 154(b) by 0 days.

(21) Appl. No.: 14/888,254

(22) PCT Filed: May 17, 2013

(86) PCT No.: PCT/EP2013/001480
§ 371 (c)(1),
(2) Date: Oct. 30, 2015

(87) PCT Pub. No.: WO2014/183773
PCT Pub. Date: Nov. 20, 2014

(65) Prior Publication Data
US 2016/0069059 A1   Mar. 10, 2016
US 2017/0152656 A9   Jun. 1, 2017

(51) Int. Cl.
*E03D 11/02* (2006.01)
*E03C 1/284* (2006.01)
*E03D 11/18* (2006.01)
*F16L 27/08* (2006.01)
*F16L 43/00* (2006.01)

(52) U.S. Cl.
CPC ............ *E03D 11/02* (2013.01); *E03C 1/284* (2013.01); *E03D 11/18* (2013.01); *F16L 27/08* (2013.01); *F16L 43/00* (2013.01)

(58) Field of Classification Search
CPC ...................................................... E03D 11/02
USPC ................................................... 4/300–442
See application file for complete search history.

(56) References Cited

FOREIGN PATENT DOCUMENTS

| | | |
|---|---|---|
| CN | 2718630 Y | 8/2005 |
| CN | 101435359 A | 5/2009 |
| CN | 201475532 U | 5/2010 |
| EP | 2441996 A2 | 4/2012 |
| GB | 2427252 | 12/2006 |
| JP | H01166885 U | 11/1989 |
| JP | 1998047051 A | 2/1998 |
| JP | 1998299475 A | 10/1998 |
| JP | 2009144520 A | 7/2009 |

(Continued)

OTHER PUBLICATIONS

Chinese Office Action and Search Report dated Aug. 4, 2015 for Chinese Patent Application No. 201380008878.3.

(Continued)

*Primary Examiner* — Lori Baker
(74) *Attorney, Agent, or Firm* — Plumsea Law Group, LLC

(57) ABSTRACT

The current invention comprises a flexible conduit means for an exhaust system of a combustion engine vehicle, comprising a bellows member (2), an outer flexible braided or knitted member (3) enclosing the bellows member, a resilient member (4), that is elastically deformable and encloses the outer braided or knitted member at least partially and abuts against it, whereas the bellows member comprises two corrugated portions (21), a connecting portion (24) between the corrugated portions, and the resilient member (4) encloses the connecting portion at least partially, the connecting portion (24) comprises flanks (25) that are formed at its axial ends and extend at least in a radial direction, and a curved portion (26) which connects the flanks with each other and which is at least partially enclosed by the resilient member (4).

14 Claims, 2 Drawing Sheets

(56) References Cited

FOREIGN PATENT DOCUMENTS

KR    1020060131257    12/2006

OTHER PUBLICATIONS

Office Action dated May 31, 2016 for Chinese Patent Application No. 201380008878.3.
Japanese Office Action dated Dec. 12, 2016 for Japanese Patent Application No. 2016-513232.
Korean Office Action dated Apr. 27, 2017 for KR Application No. 10-2015-7035596.

FLEXIBLE CONDUIT ELEMENT

The present invention relates to a flexible conduit means for an exhaust system of a combustion engine vehicle. The flexible conduit means comprises a bellows member in the shape of a hollow cylinder, an outer flexible member that encloses the bellows member at least partially, at least a resilient member that is elastically deformable and encloses the flexible member at least partially and abuts against it, whereas the bellows member comprises at least two corrugated portions that are annularly corrugated in the axial direction of the bellows member, at least the connecting portion that is formed axially between the corrugated portions of the bellows member, and the resilient member encloses the connecting portion at least partially.

Such a flexible conduit means is known from EP 2 441 996. The flexible conduit means are commonly used in the machining industry. They are placed in the presence of a combustion engine within the exhaust system between the exhaust pipe leading from the engine and the muffler. The flexible conduit means serves as a decoupler between the exhaust system and the machinery. The flexible conduit means is exposed to heat and vibration and humidity as well as impact loads which are caused by operation of the engine, the machinery and the movement of the engine itself when the engine is started or during acceleration or braking or gear shifting. In case of the application in a vehicle, the flexible conduit means is also exposed to vibrations and environmental conditions.

The known flexible conduit means shows a metal bellows with annular corrugated shape. In the middle of the metal bellows member, there is provided a circular-shaped cylindrical surface. The metal bellows member is covered by a flexible outer mesh over the complete length and fixed to the middle cylindrical portion by a spring clamp. The flexible mesh is also fixed to the metal bellows member at the outer ends of the metal bellows member. Due to the vibration of the built-in exhaust gas system, the metal bellows member is exposed to vibration and thus starts to move and create noise. Hence, the outer flexible mesh covers the metal bellows member and creates friction between the mesh and the metal bellows member.

It is an object of the present invention is to further improve the known flexible conduit means and its vibration behaviour for dampening and to enable a flexible conduit means to be provided for a wide range of applications and built-in situations and thereby reducing manufacturing costs.

The current invention solves the object by a flexible conduit means for an exhaust system of a combustion engine vehicle of the aforementioned kind, comprising a bellows member extending in an axial direction, an outer flexible braided or knitted member that encloses the bellows member at least partially, at least a resilient member, that is elastically deformable and encloses the outer braided or knitted member at least partially and abuts against it, whereas the bellows member comprises at least two corrugated portions that are annularly corrugated in the axial direction of the bellows member by alternating ridges and recesses along the outer periphery of the corrugated portions at substantially regular intervals, at least a connecting portion that is formed axially between the corrugated portions of the bellows member, and the resilient member encloses the connecting portion at least partially, and the connecting portion comprises flanks that are formed at its axial ends, and which extend at least in a radial direction, and the connecting portion in between comprising a curved and/or arched portion which connects the flanks with each other and which is at least partially enclosed by the resilient member, and the axial length of the connecting portion differs from the regular intervals of the corrugated portions.

Such a connecting portion with a curved shape leads to a curved outer surface of the connecting portion and thereby is easy to manufacture and has good vibration absorbing properties and allows for flexibility adjustment in comparison to a cylindrical shaped connecting portion. Due to the shape and the length of the connecting portion in relation to the corrugated portions which are adjacent to the connecting portion, the vibration behaviour of the bellows member can be improved.

In a preferred embodiment, the largest outer diameter of the connecting portion is smaller than the outer diameter of the adjacent corrugated portions. Thereby the resilient member can be placed inwards of the outer shape of the flexible conduit means towards the axis of the metal bellows member and thus the necessary built-in space for the flexible conduit means can be reduced. As the outer flexible member is not clamped between the metal bellows member and the resilient member but rather has contact only to the resilient member, the outer flexible member can equalize between both ends of the metal bellows member due to vibration or load conditions and is held in place by the applied tension from the resilient member. This leads to a higher tension of the complete surface of the outer flexible member as the tension is applied completely to the outer flexible member.

In a further embodiment, the curved and/or arched portion is shaped in concave and/or convex form. By these different kinds of shapes the vibration behaviour can be further improved. Due to the shape the warping moment can be adjusted positively for the load condition. A curved surface and a curved hollow body have a higher warping moment than a cylindrical shape so that the vibration response of the flexible conduit means is positively influenced as the movement and excitation of the connecting portion is further increased.

In another preferred embodiment, the curved and/or arched portion comprises a plurality of curves or bends which consist preferable of different radii. By this embodiment, different shapes and/or arched portion can be realized in the metal bellows member. Due to the different radii, the flexible conduit means can be adjusted for different applications advantageously and the available design space can be used at the optimum. By using different radii with multiple curves the flexible conduit means can be adjusted accurately to the intended vibration behaviour and response under load as curved surfaces provide generally a higher warping moment and thus a higher bending stiffness which affects the vibration behaviour.

In a preferred embodiment, the connecting portion is curved and/or arched at least partially towards the outside and towards the inside of the metal bellows member. By this design, the metal bellows member does not necessarily need to have a concave and/or convex shape only but can have a irregular or symmetrical shape. Due to the shape the outer flexible member can be tightened around the bellows member so that it is adjustable. Also in case the flexible conduit means is axially compressed, for example due to a smaller than intended built in space, the outer flexible member may only have a line contact due to the geometry of the connecting portion which is positive for vibration behaviour.

In another embodiment, the profile of the resilient member extends at least partially along the axial direction of the bellows member. By this design, the resilient member can be manufactured with reduced cost by stamping or drawing. Further the assembly of the flexible conduit means is simplified. With this design the resilient member contacts the outer flexible member at a certain axial position so that the assembly can be in regard of the positioning only.

In another preferred embodiment, the resilient member has a curved profile which substantially at least resembles the axial shape of the connecting portion. By this design, the resilient member is enabled to follow the outer shape of the bellows member and thereby the resilient member is able to follow the shape of the connecting portion very closely so as to reduce the movement due to vibration. The resilient member has substantially along its surface the same distance to the bellows members surface so that the outer flexible member is tightened and the resilient member does not touch the bellows member so that in case of vibration contact is prevented. This can also improve the usage of the provided design space as the resilient member moves closer to the connecting portion and thus the necessary diameter and circumference is reduced.

In another embodiment, the recited member presses the outer flexible braided or knitted member against the connecting portion. The outer flexible member is thus not only held in place by the tension from the resilient member but additionally by the friction between the resilient member and the connecting portion. This can be used to have a high friction force and to hold the outer flexible member in place but at the same time to reduce the tension in the rest of the outer flexible member. This will reduce the friction between the outer flexible member and the bellows member in the other portions of the flexible conduit means except the connecting portion. By this feature the tension in the outer flexible member can be adjusted specifically and locally and still the axial movement can be avoided.

In another embodiment, the contact between the outer flexible braided or knitted member and the connecting portion is substantially a line contact along the outer surface circumference of the connecting portion. Due to the line contact, a very high surface pressure between the outer flexible member and the connecting portion is realized as the contact area is small compared to a surface contact. Thus a high resistance against axial movement of the outer flexible member is further ensured. Additionally the elastic force of the resilient member in regard of material strength can be reduced as the line contact provides a high pressure which allows reduced spring forces of the resilient member.

In another embodiment, the contact between the outer flexible braided or knitted member and the connecting portion is a surface contact which extends substantially along the axial direction of the bellows member and along the outer surface circumference of the connecting portion. By this embodiment, the contact between the outer flexible member and the connecting portion can be improved by increasing the surface area and thus increasing the friction area between the outer flexible member and the connecting portion. Especially due to the arced or curved shape of the contact area the friction is increased in comparison to a plain cylindrical shape. Due to the curved surface contact the axial movement of the outer flexible member is prevented even if the spring force and thus the tension of the resilient member decreases over lifetime or due to corrosion or general aging of the material.

In a preferred embodiment, each of the flanks are connected in the axial direction to the next portion by an at least partially cylindrical portion. By this embodiment, a special area for the tooling can be provided along the bellows member and the flanks can be manufactured with reduced costs. Also the periodically repetition of the corrugated portions is discontinued and thus the vibration behaviour is improved as the cylindrical portion has a higher warping moment that the corrugated portions which improves the stiffness.

In another embodiment, the axial length between the corrugated portions which enclose a connecting portion is at least two times to seven times longer, preferably three times to six times longer, than the regular intervals of the corrugated portions. Due to the length of the connecting portion, the warping moment and the stiffness are adjusted. It has been found that the relation between the length of the regular intervals of the corrugated portion and the length of the connecting portion can be used to prevent resonance behaviour of the flexible conduit means. By the connecting portion being in the range of two to seven times the length of the regular intervals the warping moment and the stiffness increase positively dampen noise, vibration, harshness (NVH).

In a preferred embodiment, the axial length between the flanks of the connecting portion is at least 30 percent to 80 percent of the axial length between the adjacent corrugated portions which are connected to the cylindrical portion, preferably 40 to 70 percent. By this embodiment, the relation between the axial distance of the corrugated portions and the connecting portion can be further positively adjusted so that the vibration behaviour of the connecting portion does prevent a resonance of the flexible conduit means. The cylindrical portions are thus shorter in the axial direction than the curved and/or arched portion of the connecting portion and the effective diameter of the connecting portion is increased which also increases the warping moment.

In another embodiment, the largest outer diameter of the connecting portion is larger than the average diameter of at least one of the adjacent corrugated portions. The average diameter resembles the relation between the largest and smallest diameter of the corrugated portions. A large diameter of the connecting portion further helps to improve the vibration behaviour as the bending point is further moved outwards so that the excitation of the connecting portion is further increased and the stiffness of the connecting portion is further improved.

In another preferred embodiment, the smallest diameter of the connecting portion is larger than the smallest inner diameter of at least one of the adjacent corrugated portions. With the smallest diameter being on a further outward area of the connecting portion, the stiffness of the connecting portion is further improved and the bending and vibration resistance of the connecting portion is increased as the effective diameter of the connecting portion is enlarged and thus the warping moment is further increased.

The present invention will further be described by the following FIGS. 1, 2 and 3:

Figure 1:
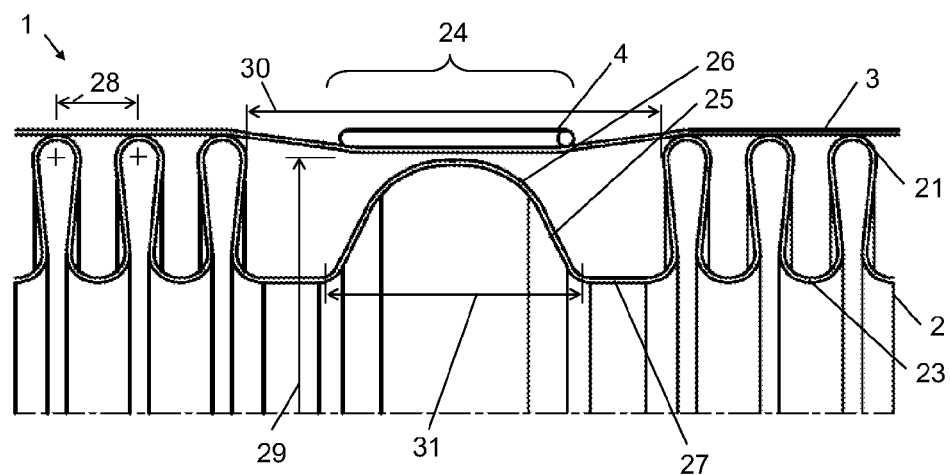
FIG. 1 shows a partial cut-out cross-section of the first embodiment.
Figure 3:
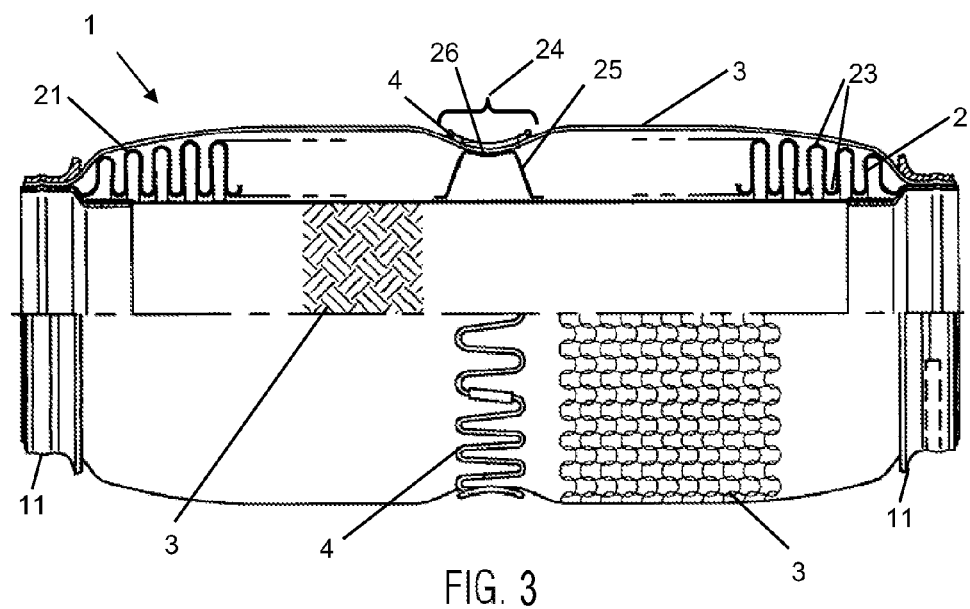
FIG. 3 shows an overview of the flexible conduit metal means of a third embodiment.

In FIG. 1, an partial axial cut view of one embodiment of the flexible conduit means 1 is shown. The flexible conduit means 1 comprises an inner bellows member 2 in the center, the adjacent outer flexible member 3, and on the outside a resilient member 4. The shown bellows member 2 comprises a corrugated portion 21 on its axial left and right side, and the connecting portion 24 axially between them. The bellows member 2 is fixedly connected to the outer flexible member on its axial outer ends with collar members 11 as shown in FIG. 3.

The bellows member 2 is comprising the corrugated portions 21 which have ridges and recesses 23 which are made by bending of the bellows member 2 towards the axial outside and the inside along the axial length of the bellows member 2. Thereby the corrugated portions 21 have annular rings along its axial surface which have an inner and an outer diameter and are repeated by regular intervals 28.

Axially between the corrugated portions 21 is the connecting portion 24. In FIG. 1, the connecting portion 24 and the adjacent corrugated portions 21 each enclose a cylindrical portion 27 between them. The cylindrical portion 27 has on each side a radius which is connected to the corrugated portion 21 and the connecting portion 24. Between the two cylindrical portions 27 is the connecting portion 24 which comprises of flanks 25 which are oriented radially and are connected by a curved or arched portion 26. The flanks may also have only a partial radial direction. By the flanks 25 the length of the connecting portion 24 is defined. Also if the connecting portion should just show a half circle shape or an elliptic shape still the flanks are necessary to connect the connecting portion 24 with the bellows member 2. Thus the connecting portion 24 is defined by the first and last flank 25 which further becomes the connecting portion 24.

The arched or curved portion of the connecting portion 24 may have any shape which have radii or continuously curved surface shapes. By rounded curves or arc shapes the vibration behaviour is positively influenced in that the warping moment of the connecting portion is increased. Together with the increase a wobbling movement or vibration is reduced and thus the transfer of vibration to the adjacent parts is lessened. Further the generation of noise from the flexible conduit means itself is reduced. The curves or arcs can have any shape and may be designed as a continuous rounded surface so that sharp bends or buckles are omitted. In FIG. 1, the arched or curved portion 26 spans the complete axial distance between the two flanks 25. The largest outer diameter 29 of the connecting portion 24 is smaller than the largest outer diameter of the corrugated portions 21. Radially further outside of the metal bellows member 2 is the outer flexible member 3 which spans over both corrugated portions 21, the bellows member 2 and the connecting portion 24.

The outer flexible member 3 is held in place against movement by the resilient member 4 which contacts the outer flexible member 3 in the area of the connection portion 24. The outer diameter of the resilient member 4 is at least the same size as the outer diameter of the outer flexible member 3 so that the outer shape of the flexible conduit means 1 is not extended beyond the outer diameter of the outer flexible member 3. The resilient member has a contact surface to the outer flexible member 3 shaped parallel to the axial direction of the flexible conduit means 1 so that it has substantially a cylindrical shape. The resilient member 4 holds the outer flexible member 3 by an radial elastic force towards the axis of the flexible conduit means thereby providing tension on the outer flexible member 3 so that the outer flexible member 3 has a movable contact to the corrugated portions 21 and friction force between the outer flexible member 3 and the corrugated portions 21 is ensured.

In the axial area of the connecting portion 24 the resilient member 4 and the outer flexible member 3 do not contact the connecting portion 24 so that the resilient member 4 has free radial play to apply the elastic force on the outer flexible member 3 and it can be ensured that the resilient member 4 can apply the complete amount of force without being blocked by the connecting portion 24 which allows an accurate adjustment of the resilient member 4 and the outer flexible member 3 to the environment and the vibration conditions. This also ensures that the tensions applied to the outer flexible member 3 is acting on the complete length of the outer flexible member 3 as the complete axial length is pulled by the resilient member 4. The outer flexible member is held on its ends by the collar members 11 so that the tension to the outer flexible member is distributed evenly over the surface.

Figure 2:
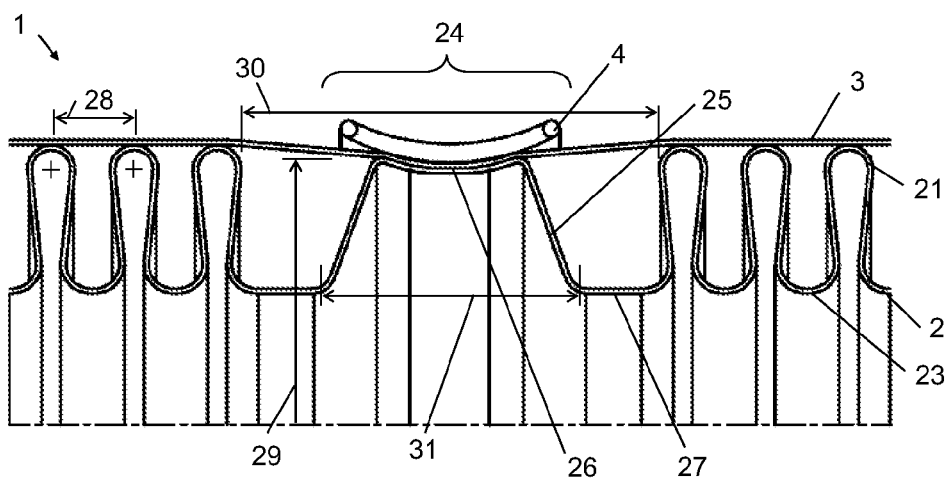
FIG. 2 shows a second embodiment of the present invention.

FIG. 2 shows another embodiment of the current invention. The construction is basically the same as shown in FIG. 1. Yet the embodiment of FIG. 2 shows a different setup of the connecting portion 24 and of the usage of the outer flexible member 3.

The connecting portion 24 also is defined by the flanks 25. Yet between the flanks 25 is a concave curved portion 26 which is also curved towards the inside of the bellows member 2. By this arrangement, the embodiment according to FIG. 2 is different to the embodiment of FIG. 1 in that the connecting portion 24 is also curved towards the inside of the bellows member 2 and is therefore similar to the surface of the connecting portion 24.

In the area of the connecting portion 24, the resilient member 4 contacts the outer flexible member 3 and presses the outer flexible member 3 on the connecting portion 24 and its curved inward portion 26 and a surface contact is provided. Due to the bent shape of the connecting portion 24 and the similar bent shape of the resilient member 4, the area of the contact surface of the outer flexible member 3 and the connecting portion 24 is further increased in comparison to a plain cylindrical-shaped area and increases the friction of the outer flexible member 3 and the connecting portion 24 so that the surface pressure of the resilient member 4 is further supported by a higher friction area between the flexible member and the connecting portion 24.

The design of the connecting portion 24 in FIG. 2 brings the resilient member 4 in contact with the connecting portion 24. Therefore the tension applied to the outer flexible member 3 can be accurately adjusted as the contact of the resilient member 4 limits the tension which is applied on the outer flexible member 3. This makes it possible in comparison to the embodiment of FIG. 1 to have the outer flexible member 3 in more loose friction contact with the bellows member 2 in the area of the corrugated portions 21 as the resilient member 4 fixes the outer flexible member 3 firmly with the surface contact.

FIG. 3 shows a flexible conduit means 1 according to another embodiment. The shown flexible conduit means 1 consists of a bellows member 2 which has on its outside the outer flexible member 3. The outer flexible member 3 is fixed to the bellows member 2 on its axial ends with collar rings 11 which are fixed by clamping or welding. The bellows member 2 comprises annular corrugations 21 along its axial length which increases the flexibility of the bellows member 2 to vibration or movement. The bellows member 2 contacts the outer flexible member 3 so that friction between the outer flexible member 3 and the bellows member 2 is ensured. Due to this friction, the noise and vibration behaviour of the flexible conduit means 1 is dampened and thus the generation of sound or vibration is reduced.

FIG. 3 shows that the outer flexible member 3 has actually a braided or knitted structure, preferably a knitted structure. In order to ensure a good friction between the outer flexible member 3 and the bellows member 2, the outer flexible member 3 is fixed to the end portions of the flexible conduit means 1 by force so that an axial tension is applied to the outer flexible member 3 which pulls the outer flexible member 3 against the surface of the corrugated portions 21 of the bellows member 2. To improve the friction of the outer flexible member 3 on the bellows member 2 a resilient member 4 is provided which surrounds the bellows member 2 in axial area of a connecting portion 24. In this embodiment the resilient member 4 is consisting of wire which is in concave shape in the axial direction.

The resilient member 4 provides a radial force on the outer flexible member 3 so that the outer flexible member 3 is clamped and held between the resilient member 4 and the connecting portion 24. The outer flexible member 3 is contacting the connecting portion 24 which has a curved portion 26 in an mainly concave shape. By the shape of the contact area the friction force is further improved by the curved shape so that under vibration load of the flexible conduit means 1 the outer flexible member 3 is held in place against axial movement. Due to the shape not only the force of the resilient member 4 in the radial direction holds the outer flexible member 3 in place but also the resistance of the curvature radius of the contact area which increases the resistance of movement along the axial direction. It is also possible to have a connecting portion 24 in a multiple curved shape.

REFERENCES

1 Flexible conduit means
11 Collar Ring
2 Bellows member
21 Corrugated portion
23 Ridges/recesses
24 Connecting portion
25 Flanks
26 Curved/arched portion
27 Cylindrical portion
28 Regular intervals
29 Largest outer diameter of the connecting portion
30 Axial length between the corrugated portions
31 Axial length between the flanks
3 Outer flexible member
4 Resilient member

The invention claimed is:

1. A flexible conduit for an exhaust system of a combustion engine vehicle, comprising:
   a bellows member extending in an axial direction,
   an outer flexible braided or knitted member that encloses the bellows member at least partially,
   at least a resilient member, that is elastically deformable and encloses the outer braided or knitted member at least partially and abuts against it,
whereas the bellows member comprises:
   at least two corrugated portions that are annularly corrugated in the axial direction of the bellows member by alternating ridges and recesses along the outer periphery of the corrugated portions at substantially regular intervals, and
   at least a connecting portion that is formed axially between the corrugated portions of the bellows member,
   wherein the resilient member encloses the connecting portion at least partially, and
   wherein the connecting portion comprises flanks that are formed at its axial ends, and which extend at least in a radial direction, and the connecting portion in between comprising an arched portion which connects the flanks with each other and which is at least partially enclosed by the resilient member, and the axial length of the connecting portion differs from the regular intervals of the corrugated portions;
characterized in that the arched portion is shaped in concave and/or convex form.

2. The flexible conduit according to claim 1, characterized in that the largest outer diameter of the connecting portion is smaller than the outer diameter of the adjacent corrugated portions.

3. The flexible conduit according to claim 1, characterized in that the arched portion comprises a plurality of curves or bends which consist preferably of different radii.

4. The flexible conduit according to claim 1, characterized in that the connecting portion is arched at least partially in a radial direction towards the outside and towards the inside.

5. The flexible conduit according to claim 1, characterized in that the profile of the resilient member extends at least partially along the axial direction of the bellows member.

6. The flexible conduit according to claim 1, characterized in that the resilient member has a curved profile which substantially at least resembles the axial shape of the connecting portion.

7. The flexible conduit according to claim 1, characterized in that the resilient member presses the outer flexible braided or knitted member against the connecting portion.

8. The flexible conduit according to claim 1, characterized in that the contact between the outer flexible braided or knitted member and the connecting portion is substantially a line contact along the outer surface circumference of the connecting portion.

9. The flexible conduit according to claim 1, characterized in that the contact between the outer flexible braided or knitted member and the connecting portion is a surface contact which extends substantially along the axial direction of the bellows member and along the outer surface circumference of the connecting portion.

10. The flexible conduit according to claim 1, characterized in that each of the flanks are connected in the axial direction to the next portion by an at least partially cylindrical portion.

11. The flexible conduit according to claim 1, characterized in that the axial length between the corrugated portions which enclose a connecting portion is at least two times to seven times longer than the regular intervals of the corrugated portions.

12. The flexible conduit according to claim 1, characterized in that the axial length between the flanks of the connecting portion is at least 30 percent to 80 percent of the axial length between the adjacent corrugated portions which are connected to the cylindrical portion.

13. The flexible conduit according to claim 1, characterized in that the largest outer diameter of the connecting portion is larger than the averaged diameter of at least one of the adjacent corrugated portions.

14. The flexible conduit according to claim 1, characterized in that the smallest diameter of the connecting portion is larger than the smallest inner diameter of at least one of the adjacent corrugated portions.

* * * * *